BALLISTIC CUTTING IMPLEMENT
Original Filed April 28, 1970
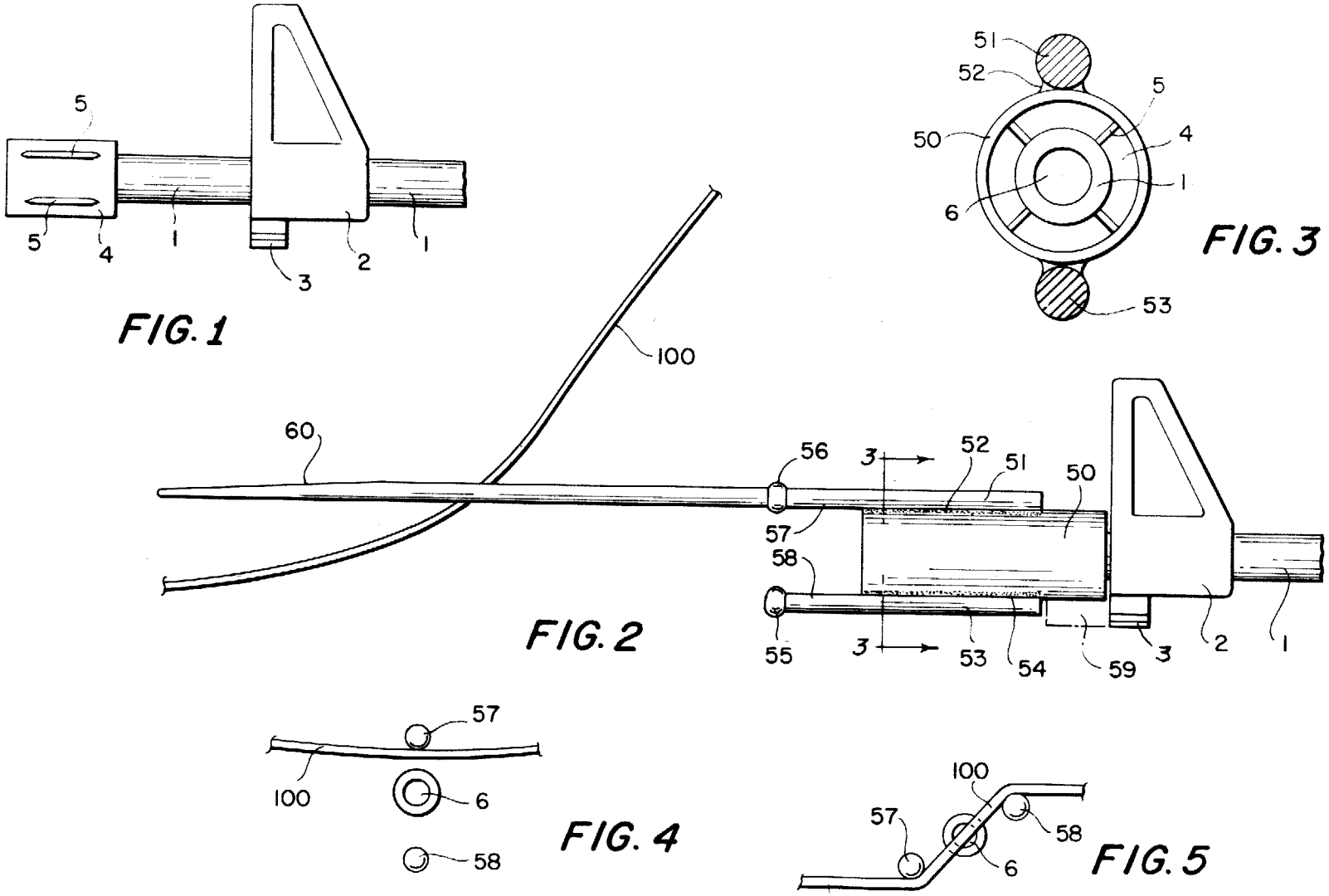

United States Patent Office

Re. 28,146
Reissued Sept. 3, 1974

28,146
BALLISTIC CUTTING IMPLEMENT

Daniel D. Musgrave, 8201 Caraway St.,
Cabin John, Md. 20731

Original No. 3,657,835, dated Apr. 25, 1972, Ser. No. 32,523, Apr. 28, 1970. Application for reissue Feb. 5, 1974, Ser. No. 439,832
Int. Cl. F41c *27/00*
U.S. Cl. 42—90 4 Claims

Matter enclosed in heavy brackets [ ] appears in the original patent but forms no part of this reissue specification; matter printed in italics indicates the additions made by reissue.

ABSTRACT OF THE DISCLOSURE

An implement is mounted on the muzzle of a firearm to permit severing a strand of wire or other obstacle by discharging a bullet. The implement includes windlassing means to take up slack in the strand and thereby assure alinement of the strand with the bore of the firearm. The windlassing means is compatible with a variety of obstacle materials of different configurations and dimensions.

The efficiency of military obstacles has been greatly increased by improvements in barbed materials. The ordinary hand-operated wire cutters are relatively ineffective against the newer obstacles, and they are open to the serious objection that the user must lay his firearm aside while cutting. The cutting process in fatigueing and necessitates reaching the hand into the obstacle with consequent danger of injury. This invention comprises means tor cutting the obstacle material ballistically with a bullet, while the user keeps his hands in the normal firing position, gripping his firearm.

This invention comprises an accessory for use with a firearm such as a military rifle. It is not intended to limit the invention to any particular firearm. For convenience, the muzzle portion of a typical military rifle is shown in the drawing and briefly described herein, but it will readily be apparent that the invention can be used with many different types and models of firearms, including both modern, and older, firearms.

It should also be pointed out that the invention is shown in combination with a bayonet, but this is not essential. The invention is independent of the bayonet feature and can be manufactured and put into practice without said bayonet feature. Elimination of the bayonet portion will obviously decrease the size and weight of the device, and of course will also reduce the production cost. However, as will be explained later, the bayonet portion can actually increase the efficiency of the cutting operation under combat conditions.

The principal object of this invention is to provide a ballistic cutting implement for mounting on the muzzle of a firearm.

Another object is to provide such an implement in combination with a bayonet.

Another object is to provide such an implement which can be used without requiring the user to release his grip on the firearm on which the implement is mounted.

These and other objects of the present invention will be apparent upon reference to the following specifications, taken in connection with the accompanying drawings, wherein:

FIG. 1 is a side elevation of the muzzle portion of a typical modern military rifle.

FIG. 2 is a side elevation of an embodiment of this invention installed on the muzzle of a typical modern military rifle.

FIG. 3 is a transverse section taken in the plane indicated by line 3—3 on FIG. 2.

FIG. 4 is a schematic illustration of the first step in using the implement to cut a strand.

FIG. 5 is a schematic illustration of the second step in using the implement to cut a strand.

Referring now to the drawings in detail, FIG. 1 shows the front or muzzle portion of a typical military rifle, the barrel of which is indicated by numeral 1. Also shown are a sight bracket 2, a bayonet lug 3, and a flash suppressor 4, which has longitudinal slots 5. The present invention is not shown in FIG. 1, which simply shows one type of rifle muzzle on which the invention might be mounted.

FIGS. 2 and 3 show an embodiment of this invention mounted on the same type of rifle muzzle as is shown in FIG. 1. The ballistic cutting implement has a housing or sleeve 50, which encompasses the muzzle of the rifle. In the instance illustrated it actually encompasses flash suppressor 4, which happens to be the most convenient member for mounting purposes. A latch, or detent, 59 is indicated (but not shown) for the purpose of retaining sleeve 50 against bayonet lug 3. In the practice of the invention it will of course be necessary to adapt the mounting arrangements to the firearm on which it is to be used.

Fixed to sleeve 50 by any convenient method, such as weld 52, is shaft 51. Also fixed to sleeve 50 by some convenient method, such as by weld 54, is windlass bar 53. It may be noted in FIG. 3, that shaft 51 and bar 53 are positioned 180 degrees apart on the circumference of sleeve 50.

Shaft 51 and bar 53 extend some distance from the front of sleeve 50, front meaning the end facing in the direction in which the rifle, or other firearm, is pointing. Bar 53 terminates in an enlarged portion, or swell 55. A similar swell 56 is formed on shaft 51. The swells 55 and 56 are located at substantially the same distance from sleeve 50. That portion of shaft 51 between swell 56 and the sleeve constitutes a windlassing lug, 57. The corresponding portion of bar 53 between swell 55 and the sleeve constitutes another windlassing lug, 58. In the disclosed embodiment shaft 51 is extended to form a bayonet portion 60. In FIG. 3, the bore of the firearm is indicated at 6. In FIG. 2, 100 is a strand of material, such as fence wire which is to be cut.

In operation, the severing of a strand of obstacle or other material is accomplished by discharging a bullet from the firearm on which the implement is mounted. This requires that the strand be held firmly in line with the bore of the firearm.

In FIG. 2, the bayonet portion 60 of the implement is resting on a strand 100, to be cut. If the firearm with the implement mounted, is now moved toward the strand, the sleeve will contact the strand, which will then be between windlassing lugs 57 and 58. This situation is shown schematically in FIG. 4.

If the rifle is now rotated around its longitudinal axis, lugs 57 and 58 will windlass strand 100. When sufficient tension is exerted on the strand a portion of it will be alined with the axis 6, of the bore of the firearm. A bullet may now be discharged to sever the strand. This situation is shown schematically in FIG. 5.

It will be apparent that the bayonet feature is not essential to the practice of this invention. It is an advantage however, because it assists in quickly positioning the material to be cut between the windlass lugs, in the manner described hereinbefore. When the implement is removed from the firearm, the sleeve serves as the handgrip of the bayonet.

Swells 55 and 56 are provided to assure that the strand to be severed does not slip out of engagement with the lugs, during windlassing.

What I claim is:

1. A ballistic cutting implement comprising: a housing adapted to be fixed on the muzzle of a firearm with the axis of the bore of said firearm substantially coincident with one axis of said housing; a first lug affixed to said housing with one axis of said lug substantially parallel to but not coincident with said axis of said bore, said lug being positionally adapted for engagement with a strand to be cut; a second lug affixed to said housing with one axis of said second lug substantially parallel to but not coincident with said axis of said bore, said second lug being positionally adapted for engagement with a strand to be cut, and the respective axes of said first lug, said second lug, and said bore being positioned in the same plane; and detent means on [each] *at least one* said lug positionally adapted for maintaining the engagement of [each] said lug with said strand; whereby when a strand is positioned between said first lug and said second lug, rotation of said firearm about the axis of said bore will tension said strand and aline a portion of said strand with said axis of said bore.

2. The implement claimed in Claim 1 further characterized by one of said lugs having a bayonet point.

3. The implement claimed in Claim 1 further characterized by said housing being adapted to serve as a handgrip.

*4. The implement claimed in Claim 1 further characterized by one of said lugs extending from said housing a substantially greater extent than does the other said lug.*

References Cited

The following references, cited by the Examiner, are of record in the patented file of this patent or the original patent.

UNITED STATES PATENTS

| | | | |
|---|---|---|---|
| 655,577 | 8/1900 | Pell et al. | 42—90 |
| 1,211,779 | 1/1917 | Steinmetz | 42—90 |

BENJAMIN A. BORCHELT, Primary Examiner

C. T. JORDAN, Assistant Examiner